United States Patent [19]
Wolff et al.

[11] Patent Number: 5,941,587
[45] Date of Patent: Aug. 24, 1999

[54] GRASPING TOOL

[76] Inventors: Ronald Wolff; Glenn A. Neher, Jr., both of 7869 E. Kenyon Ave., Denver, Colo. 80237

[21] Appl. No.: 09/094,445

[22] Filed: Jun. 10, 1998

[51] Int. Cl.⁶ .................................................. B25J 1/02
[52] U.S. Cl. ...................................... 294/19.1; 294/103.1
[58] Field of Search ............................. 294/16, 19.1, 11, 294/22–24, 34, 50.9, 103.1, 104, 119.1; 56/332, 337; 81/126, 128, 487, 488

[56] References Cited

U.S. PATENT DOCUMENTS

| | | |
|---|---|---|
| 582,293 | 5/1897 | Koester . |
| 690,567 | 1/1902 | Drynan . |
| 747,376 | 12/1903 | Christman .................................. 294/22 |
| 872,748 | 12/1907 | Putney . |
| 960,070 | 5/1910 | Brown . |
| 1,094,233 | 4/1914 | Methvin .................................... 294/22 |
| 1,519,938 | 12/1924 | Smith ................................. 294/19.1 X |
| 1,591,354 | 7/1926 | Baillie ............................. 294/103.1 X |
| 1,638,703 | 8/1927 | Pendleton . |
| 2,319,992 | 5/1943 | Hubbard . |
| 2,616,741 | 11/1952 | Ziese . |
| 2,762,647 | 9/1956 | Guest . |
| 3,474,833 | 10/1969 | Garrette et al. . |
| 3,785,689 | 1/1974 | Tanksley .................................. 294/19.1 |
| 4,253,697 | 3/1981 | Acosta ............................... 294/19.1 X |
| 4,449,743 | 5/1984 | Pankratz .................................... 294/11 |

FOREIGN PATENT DOCUMENTS

| | | | |
|---|---|---|---|
| 1273954 | 9/1961 | France ..................................... 294/22 |

*Primary Examiner*—Johnny D. Cherry
*Attorney, Agent, or Firm*—Ramon L. Pizarro; Edwin H. Crabtree

[57] ABSTRACT

A grasping device including an elongated body with a first end and a second end, the first end of the elongated body having a cammed lever for pulling a wire. The wire extends through a first jaw having a first end and a second end, and attaches to a second jaw having a first end and a second end; the two jaws are connected by pins that allow sliding motion of the second end of the second jaw towards the second end of the first jaw in response to a pull of the wire. A casing slidably retains the pull wire, so that pulling of the wire with the cammed lever will pull the second jaw towards the first jaw while the casing remains stationary against the first jaw.

16 Claims, 3 Drawing Sheets

GRASPING TOOL

BACKGROUND OF THE INVENTION (a) Field of the Invention

This invention generally relates to a device for aiding in grasping or reaching for articles at a distance. More particularly, but not by way of limitation, to a grasping device which includes a telescoping body and a pair of opposable, parallel acting, jaws.

(b) Discussion of Known Art

The need to extend one's reach in order to grasp or manipulate articles at a distance from one's body has been long felt. Accordingly, there have been many approaches at solving the problems associated with extending one's reach. For example, in U.S. Pat. No. 690,567 to Dryan a tool for aiding in the picking of flowers or fruit has been taught. The Dryan tool uses a set of jaws which move in a generally parallel manner relative to one another in order to grasp the stem of a flower or fruit being picked with the tool. The jaws are activated by means of a rod which is slid through a tube. The rod is fixedly connected to one of the jaw sections, and the tube is fixedly connected to the opposing jaw section. Thus, moving the rod within the tube moves the jaw sections in a parallel manner relative to one another. Unfortunately, however, this early tool has disadvantages in that in order to extend or vary the reach achieved with a tool, one must provide a longer tube and a longer rod, and some sort of attachment or connection means for attaching these extensions. A further disadvantage of this design is that operation requires the use of two hands to activate the jaws. Many times when an extension tool is needed, the user will not have both hands available, or may not have the ability to provide the pumping action along the tool to activate or close the jaws.

Another approach at providing an extension tool is caught in U.S. Pat. No. 872,748 to Putney. The Putney device, however, is disadvantaged in that it uses a solid rod actuator, together with scissoring jaws. The scissoring action is particularly disadvantaged and the scissoring action tends to pinch the article being gripped at a location closest to the vertex of the scissoring limbs. This can lead to excessive pressure at a location where great force is not desired, and float or no pressure where one actually wants to exert a force.

Another extension or gripping device is taught in U.S. Pat. No. 960,070 to Brown which uses parallel acting jaws. The jaws of the Brown device must be actuated by means of a rigid rod or link which must be used to push one of the jaw sections to the open position. The use of a rigid rod or link to push the jaw open greatly reduces the ability or feasibility of extending the length of reach of the device. As was discussed earlier, in order to extend a shaft or rod one must provide extension sections of the desired length as well as means for inserting in attaching these extension sections to the balance of the body of the tool.

Yet another tool for allowing the extension of one's grip is taught in U.S. Pat. No. 1,638,703 Pendleton. The Pendleton device, however, suffers from similar disadvantages as its predecessors. Namely, the device uses solid links which are difficult to extend. Moreover, the Pendleton device uses a variation of a scissoring or levered type action to grip articles. As discussed above, this is disadvantaged in that it results in pinching or uneven gripping of the article being picked up or clamped.

Variations on the above devices include the structure shown in U.S. Pat. No. 2,616,741 to Ziese. The Ziese device includes a pair of L-shaped jaws which are used in a scissoring manner. The Ziese device can be extended, however, by fixed increments which use the rigid component of fixed lengths.

Another variation is taught in U.S. Pat. No. 2,762,647 to Guest. The Guest patent teaches the use of a wire and reel to activate a jaw that opposes a stationary jaw member. The Guest device offers important advantages in that it uses the flexible cable or wire to move one jaw section against another jaw section. The flexible cable, however, requires a series of pulleys or sheaves to allow tension to be transmitted from a ratchet means to the jaws in order to close and keep the jaws in a closed position. The use of cables and pulleys to close the jaws presents important disadvantages. A significant disadvantage is the possibility of having the cables jump the pulleys, and thus preventing proper operation of the device. Additionally, the wire and pulley arrangement requires that a pulley be placed near the moving jaw in order to pull against the spring and the jaw. Still further, the pulley and pull wire arrangement taught by Guest requires that the take-up unit or pawl mechanism be incorporated into the system in order to allow adequate movement of the wire to properly close the jaws. Still further, the device taught by Guest does not address the problems or advantages of providing a set of jaws that move in a generally parallel manner relative to one another. More importantly, Guest does not teach or suggest how to provide for such a mechanism.

Thus, it will be apparent of the above discussion that there remains a need for a simple reach device which will provide jaws that will move in a generally parallel manner relative to one another.

There remains a need for an extension or reaching device which does not require the use of ratchets or pumping action in order to activate or close the jaws.

There remains a need for a reaching device which can be elongated or extended.

There remains a need for a reaching and grasping device which can grasp articles at various angles.

SUMMARY

It has been discovered that the problems left unanswered by known art can be solved by providing a reach device which includes:

a) a pair of opposing, parallel acting, jaws;

b) an elongated body; and c) a pull wire and casing to activate the jaws.

In a highly preferred embodiment of the invention, the opposing jaws include at least one pair, and most preferably, two pairs of shaft pins which allow sliding motion of the jaws and ensure that the opposing jaws move in a parallel manner towards one another. Additionally, a spring is placed between the two jaw sections in order to restore the position of the jaws.

The jaws are activated by means of a pull wire. The pull wire will preferably include a wire core which extends within a flexible casing. The wire core can slide within the flexible casing. Thus, by pulling on the wire core, one may pull on and activate the jaws.

The wire core attaches to one of the jaw sections, while the flexible casing is held on the opposing jaw section. Since the wire core can slide within the casing, by pulling on the wire core one can bring the jaw sections closer to one another. The pins or shafts that hold the jaw sections relative to one another will preferably also support a spring which mounts over the pins or shafts. The spring will serve for spreading the jaw sections apart from one another once the wire core has been released.

The wire core together with the flexible casing will extend within the elongated body. Due to the fact that the jaws are activated by movement of the wire core relative to the casing, it has been discovered that it is possible to incorporate a telescoping action to the elongate body without affecting the function of the jaws. By allowing the elongate body to extend, one produces important useful results that can not be achieved with devices shown in the prior art. Importantly, one may now adjust the length of the arm or tool, without affecting its usefulness.

Another important feature of the invention is the use of a cammed, levered actuator means to allow the user to achieve a greater degree of control over the movement and grip achieved with the jaws.

Thus, it will be understood that the disclosed invention allows extension of the tool in infinitesimal increments without the need for spools or the inconvenience of preset, fixed, increments of extension.

Still further, it will be appreciated that the disclosed invention solves problems associated with scissoring mechanisms by gripping articles with an even, parallel action.

It will also be understood that the disclosed invention greatly simplifies the mechanical components needed to grip articles securely and evenly at a distance.

Thus, it will be understood that the disclosed invention will greatly help those needing to reach small articles or components, such as small wires and the like at a distance without the need to use ladders or other similar devices.

It will be understood that the disclosed invention will be easily used by those who do not have full use of their hands, due to arthritis or other debilitating diseases, to lift or grip articles at a distance. Still further, the disclosed invention will help those confined to wheelchairs in reaching and grasping things on top of counters or other places.

It should also be understood that while the above and other advantages and results of the present invention will become apparent to those skilled in the art from the following detailed description and accompanying drawings, showing the contemplated novel construction, combinations and elements as herein described, and more particularly defined by the appended claims, it is understood that changes in the precise embodiments of the herein disclosed invention are meant to be included within the scope of the claims, except insofar as they may be precluded by the prior art.

DRAWINGS

The accompanying drawings illustrate preferred embodiments of the present invention according to the best mode presently devised for making and using the instant invention, and in which.

DETAILED DESCRIPTION OF PREFERRED EMBODIMENTS

While the invention will be described and disclosed here in connection with certain preferred embodiments, the description is not intended to limit the invention to the specific embodiments shown and described here, but rather the invention is intended to cover all alternative embodiments and modifications that fall within the spirit and scope of the invention as defined by the claims included herein as well as any equivalents of the disclosed and claimed invention.

Figure 1:
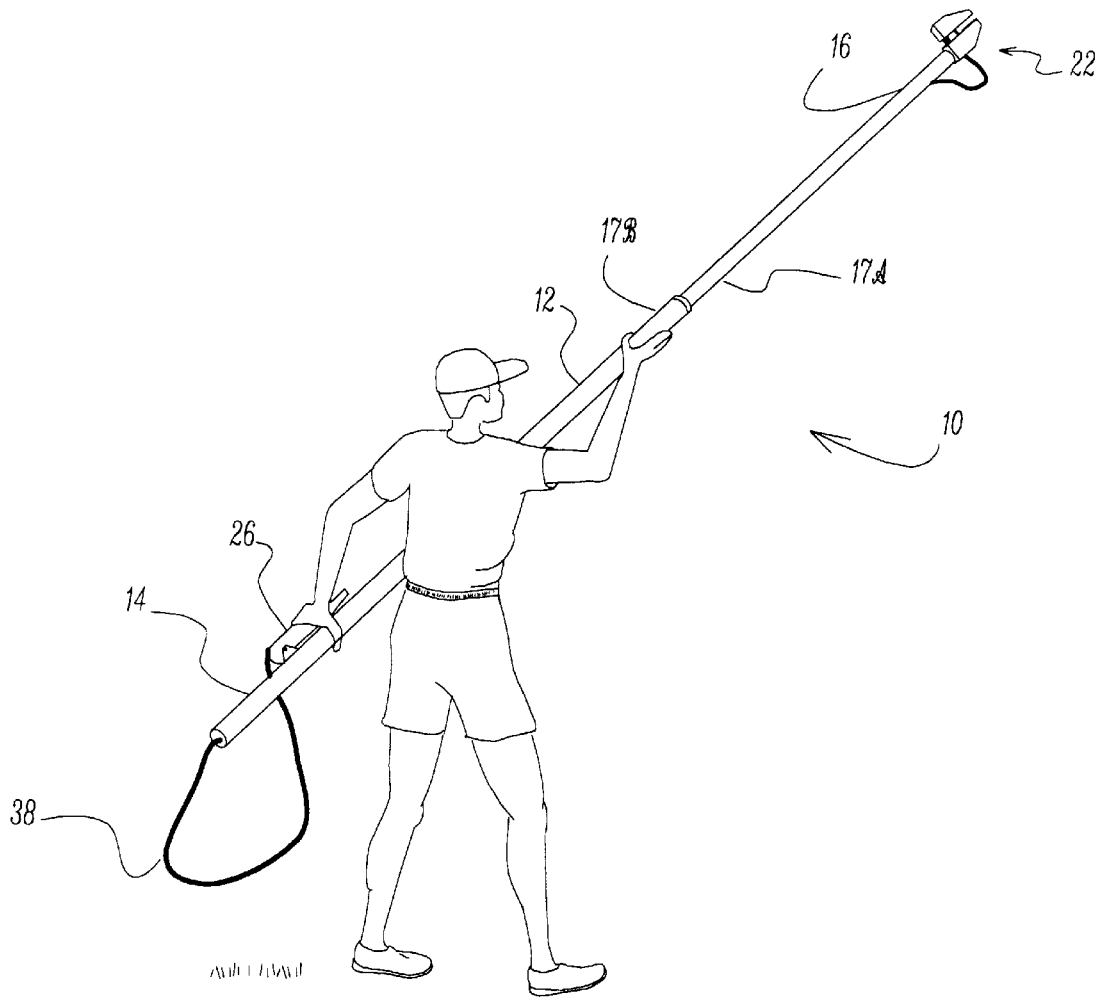
FIG. 1 is a perspective view illustrating the use of the invention.

Turning now to FIG. 1 where a grasping device 10 made in accordance with the principles taught herein has been illustrated while in use. The illustrated grasping device 10 includes an elongated body 12 having a first end 14 and a second end 16. As illustrated in FIG. 1, the elongated body 12 preferably includes telescoping sections 17A and 17B, which are fixed relative to one another by means of a setting means 18, which in a preferred embodiment is simply a pair of conical annular rings, one ring being threadably engaged over the other ring, which is preferably a flexible ring, so that tightening of the rings against one another causes the flexible ring to contract, thereby clamping against a tube or the like that extends through the flexible ring. While the described setting means 18 is simply the currently best known method of providing adjustable, telescoping, adjustability to the elongated body 12, it is contemplated that any known means for allowing extension of the body may be used with the instant invention. This versatility of the grasping device 10 is in large part due to the use of a pull wire 20 which is used to actuate a pair of opposing jaws 22 mounted at the second end 16 of the elongated body 12.

Figure 2:
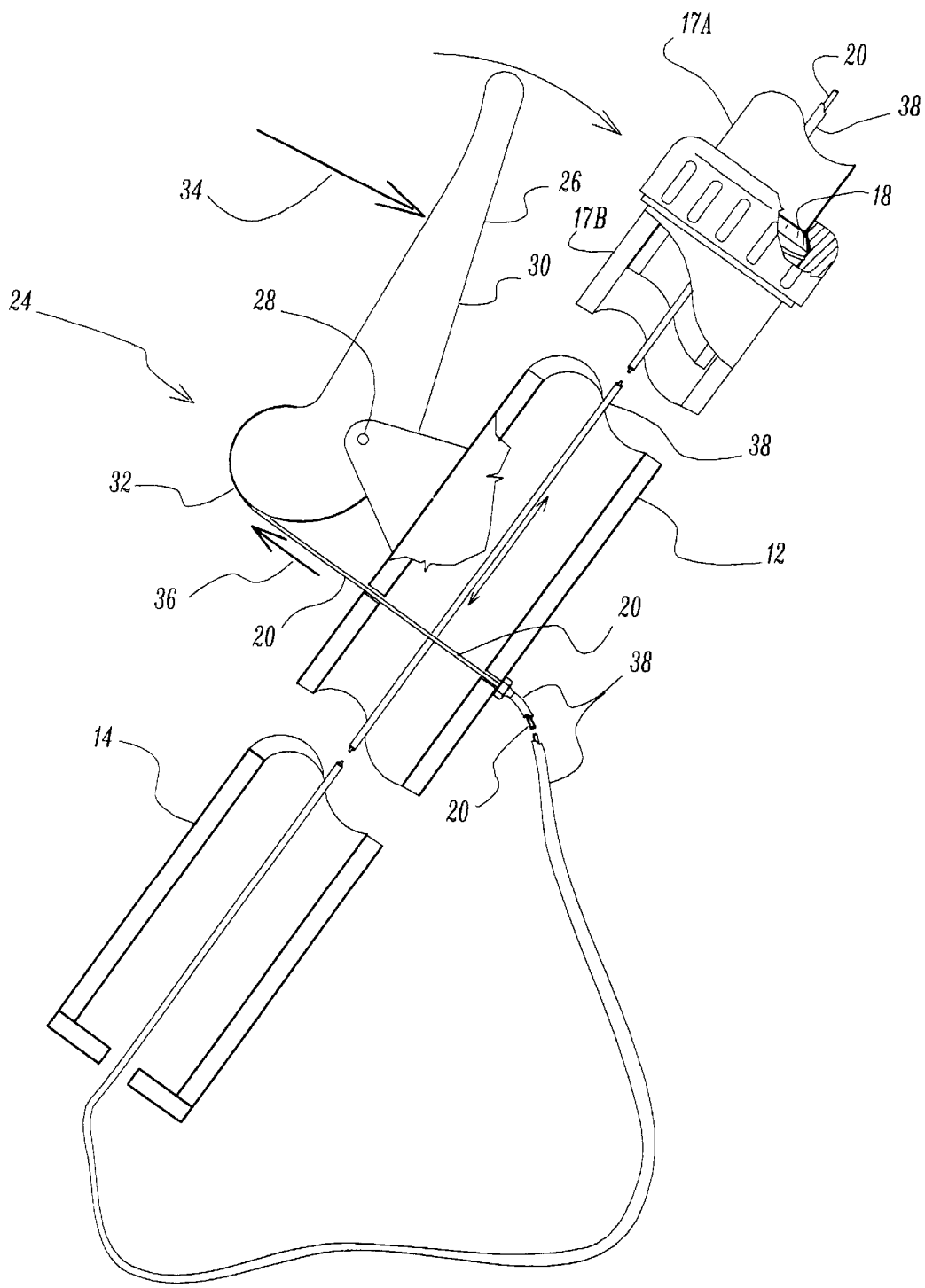
FIG. 2 is a side sectional view of an end of the invention, illustrating the routing of the cable and casing together with the lever and cam action used to actuate the jaws.

Turning now to FIG. 2, it will be understood that mounted at the first end 14 of the elongated body 12 of a preferred embodiment of the invention will be a cammed means 24 for pulling the pull wire 20. In a highly preferred embodiment of the invention the cammed means 24 includes a lever 26 having a pivot point 28, a handle portion 30, and a cammed surface 32. While it is contemplated that other arrangements are within the scope of the invention, in a highly preferred embodiment of the invention, the cammed surface 32 and the handle portion 30 are part of a lever 26 which is of unitary, one piece construction. With this arrangement, the cammed surface 32 responds to movement of the handle 30, the pull wire 20 being connected to the cammed surface 32, so that a force 34 on the handle produces a varying pull force 36 on the wire depending on the angle of rotation of the lever 26.

Also shown on FIG. 2 is that in a highly preferred embodiment of the invention the pull wire 20 is slidably retained and housed in a flexible casing 38 which extends from the opposing jaws 22 on to the first end 14 of the elongated body 12.

Preferably, the casing 38 and pull wire 20 are slightly longer than the elongated body 12, when the elongated body 12 is in its fully extended position.

As shown on FIG. 2, the casing 38 will preferably terminate against the first end 14 of the elongated body 12, and the pull wire 20 will extend from the casing 38 and attach to the cammed surface 32. Thus, by exerting a force 34 against the handle 30, one causes the cammed surface 32 to rotate, changing the leverage ratio between the point of contact of the pull wire 20 and the cammed surface 32 and the handle 30. This change in the leverage ratio allows the incorporation of a large mechanical advantage during the stage where the jaws are furthest apart from one another, or vice versa, depending on the need of the user and application.

FIG. 1 and 2 also show that the casing 38, together with the pull wire 20, will preferably extend towards the second end 16 of the elongated body 12, with the casing 38 terminating against a first jaw 40 of the pair of opposing jaws 22. As shown on FIG. 3, the first jaw 40 includes a first end 42 and a second end 44. The first end 42 of the first jaw 40 is attachable to the second end 16 of the elongated body 12. Additionally, the second end 44 of the first jaw 40 will preferably include a clamping surface 46 which may be of flat or generally rounded shape, and include a gripping material 48 such as neoprene rubber or the like.

Figure 3:
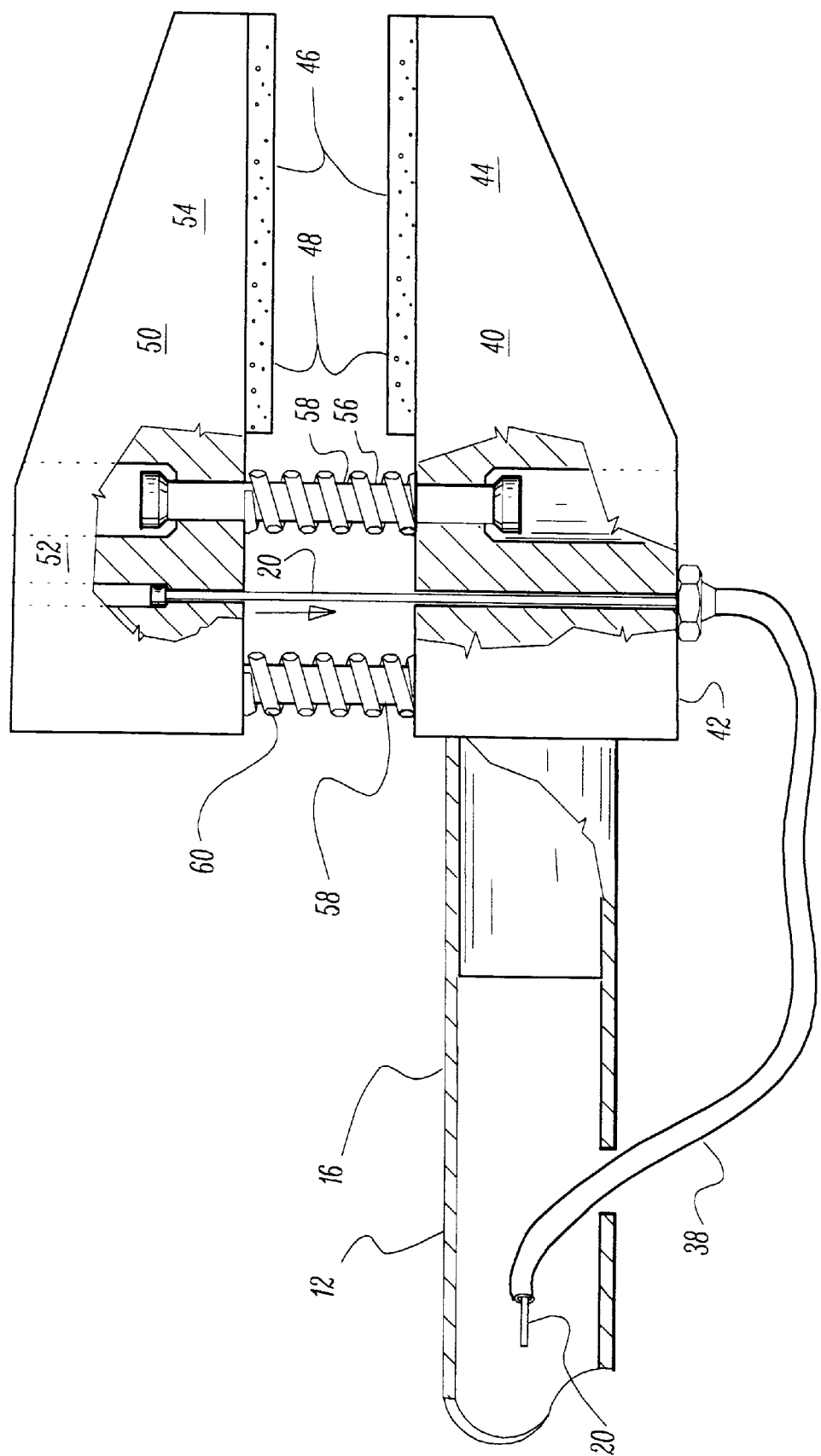
FIG. 3 is a side sectional view of an end of the invention, the end supporting the jaws, further illustrating the routing of the cable and casing together with the parallel support structure for the jaws.

Also shown on FIG. 3 is that the opposing jaws 22 will preferably also include a second jaw 50 which also includes a first end 52 and a second end 54. Mounted between the first end 52 of the second jaw 50 and the first end 42 of the first jaw 40 is a means 56 for allowing sliding motion of the first end 52 of the second jaw 50 towards the first end 42 of the first jaw 40. Since the second end 54 of the second jaw 50 will preferably be a part of the same jaw, motion of the first end 52 of the second jaw 50 towards the first end 42 of the first jaw 40 will result in motion of the second end 54 of the second jaw 50 towards the second end 44 of the first jaw 40. The second end 54 of the second jaw 50 includes a clamping surface 46 which opposes the clamping surface 46 on the first jaw 40.

Also shown on FIG. 3 is that the pull wire will preferably extend through the first end 42 of the first jaw 40, through much of the first end 52 of the second jaw 50, and be retained within the first end 52 of the second jaw 50. Since the casing terminates at, and is retained against the first end 42 of the first jaw 40, a pull on the pull wire 20 by turning the handle 30 will cause the pull wire 20 to slide within the casing 30, through the first end 42 of the first jaw 40. This sliding action will in turn cause the first end 52 of the second jaw 50 to be pulled towards the first end 42 of the first jaw 40.

As shown on FIG. 3, the second jaw 50 will preferably be supported over the first jaw 40 by means 56 for allowing sliding motion of the second jaw 50 towards the first jaw 40. In a highly preferred embodiment of the invention, these means 56 for allowing sliding motion include at least one pair, but preferably two pairs of generally parallel pins 58, slidably mounted through the first end 42 of the first jaw 40 and slidably mounted through the first end 52 of the second jaw 50.

To restore the position of the second jaw 50 relative to the first jaw 40, a set of springs 60 is preferably placed about the pins 58. Thus, the assembly of the pins 58 through the jaws 22 holds the springs 60 between the jaws 22. Clearly, while it is contemplated that helical springs be used, it is also contemplated a leaf spring or other equivalent spring means may also be used.

Thus, it can be appreciated that the above described embodiments are illustrative of just a few of the numerous variations of arrangements of the disclosed elements used to carry out the disclosed invention. Moreover, while the invention has been particularly shown, described and illustrated in detail with reference to preferred embodiments and modifications thereof, it should be understood that the foregoing and other modifications are exemplary only, and that equivalent changes in form and detail may be made without departing from the true spirit and scope of the invention as claimed, except as precluded by the prior art.

What is claimed is:

1. A grasping device comprising:

an elongated body having a first end and a second end, the first end of the elongated body having means for pulling a wire;

a first jaw having a first end and a second end, the first end of said first jaw being attachable to the second end of said elongated body;

a second jaw having a first end and a second end, the first end of said second jaw having means for allowing sliding motion of the second end of said second jaw towards the second end of said first jaw; and a pull wire and casing, said pull wire being slidably retained within the casing, said casing extending from said first end of said elongated body to said first jaw, said pull wire extending from the means for pulling a wire on said first end of said elongated body and extending beyond said first jaw, and being attached to said second jaw, so that pulling of said wire with said means for pulling a wire on said first end of said elongated body will pull said second jaw towards said first jaw while said casing remains stationary against said first jaw.

2. A grasping device according to claim 1 wherein said pull wire extends through said first jaw.

3. A grasping device according to claim 2 wherein said means for allowing sliding motion of the second end of said second jaw towards the second end of said first jaw comprises at least one pair of spaced apart pins, said pins being slidably mounted between said first end of said first jaw and said first end of said second jaw and on opposite sides of said pull wire.

4. A grasping device according to claim 3 and further comprising at least one spring means positioned about each of said pins.

5. A grasping device according to claim 1 wherein said means for pulling a wire comprises a lever having a pivot point, a handle portion, and a cammed surface, the cammed surface responding to movement of the handle portion, the wire being connected to the cammed surface, so that a force on the handle portion produces a varying pull force on the wire.

6. A grasping device comprising:

an elongated body having a first end and a second end, the first end of the elongated body having cammed means for pulling a wire;

a first jaw having a first end and a second end, the first end of said first jaw being attachable to the second end of said elongated body, the second end of said first jaw having a clamping surface;

a second jaw having a first end and a second end, the first end of said second jaw having means for allowing sliding motion of the second end of said second jaw towards the second end of said first jaw, the second end of said second jaw having a clamping surface that opposes the clamping surface on said first jaw; and a pull wire and casing, said pull wire being slidably retained within the casing, said casing extending from said first end of said elongated body to said first jaw, said pull wire extending from the means for pulling a wire on said first end of said elongated body and extending beyond said first jaw, and being attached to said second jaw, so that pulling of said wire with said means for pulling a wire on said first end of said elongated body will pull said clamping surface on said second jaw towards the clamping surface on said first jaw while said casing remains stationary against said first jaw.

7. A grasping device according to claim 6 wherein said pull wire extends through said first jaw.

8. A grasping device according to claim 7 wherein said means for allowing sliding motion of the second end of said second jaw towards the second end of said first jaw comprises at least one pair of spaced apart pins, said pins being slidably mounted between said first end of said first jaw and said first end of said second jaw and on opposite sides of said pull wire.

9. A grasping device according to claim 8 and further comprising at least one spring means positioned about each of said pins.

10. A grasping device according to claim 9 wherein said means for pulling a wire comprises a lever having a pivot point, a handle portion, and a cammed surface, the cammed surface responding to movement of the handle portion, the wire being connected to the cammed surface, so that a force on the handle portion produces a varying pull force on the wire.

11. A grasping device according to claim 10 wherein said second end of said first jaw and said second end of said second jaw are next to said first end of said first jaw and said first end of said second jaw, so that said pull wire is between said second end of said first jaw and said second end of said second jaw and at a distance from said clamping surface on said first jaw and said clamping surface on said second jaw.

12. A grasping device comprising:

an elongated telescoping body having a first end and a second end, and a pull wire, the first end of the elongated body having cammed means for taking up the pull wire;

a pair of opposing jaws, each jaw comprising a first end and a second end, the first end of each jaw having means for allowing sliding motion of the second end of each of said jaws towards one another; and a casing for slidably retaining said pull wire, said casing extending from said first end of said elongated body to said first end of one of said jaws, said pull wire extending through said first ends of said jaws, and being attached to one of said jaws, so that pulling of said wire with said means for taking up the pull wire on said first end of said elongated body will pull said first ends of said jaws towards one another causing the second ends of said jaws to close by moving towards one another.

13. A grasping device according to claim 12 and further comprising means for allowing reciprocating sliding motion of the first ends of said jaws towards and away from one another.

14. A grasping device according to claim 13 wherein said means for allowing reciprocating sliding motion comprises at least one pair of spaced apart pins, said pins being slidably mounted through the first ends of said jaws.

15. A grasping device according to claim 14 and further comprising at least one spring means positioned about each of said pins.

16. A grasping device according to claim 15 wherein said cammed means for taking up the pull wire comprises a lever having a pivot point, a handle portion, and a cammed surface, the cammed surface responding to movement of the handle portion, the wire being connected to the cammed surface, so that a force on the handle portion produces a varying pull force on the wire.

* * * * *